Patented Sept. 25, 1951

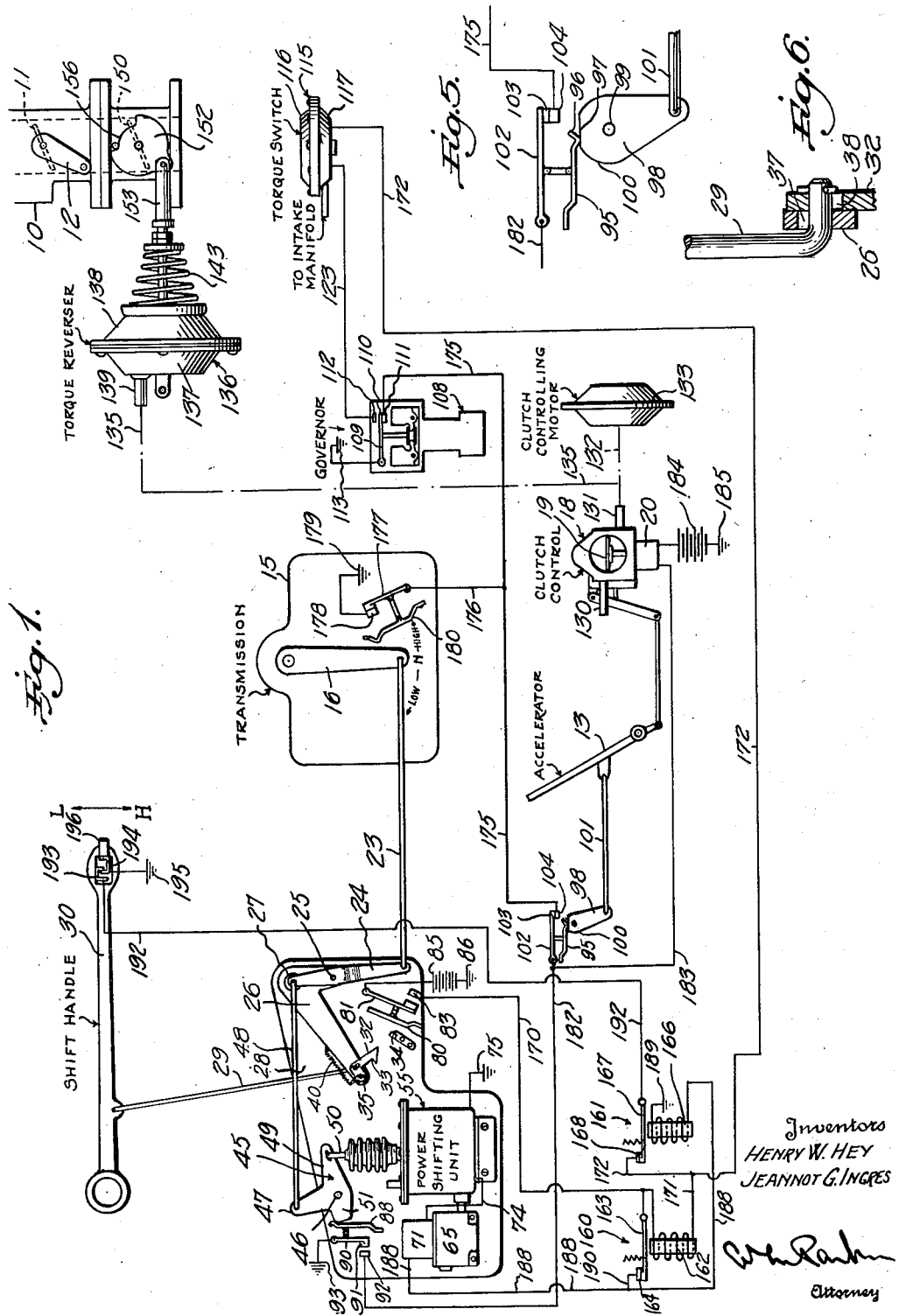

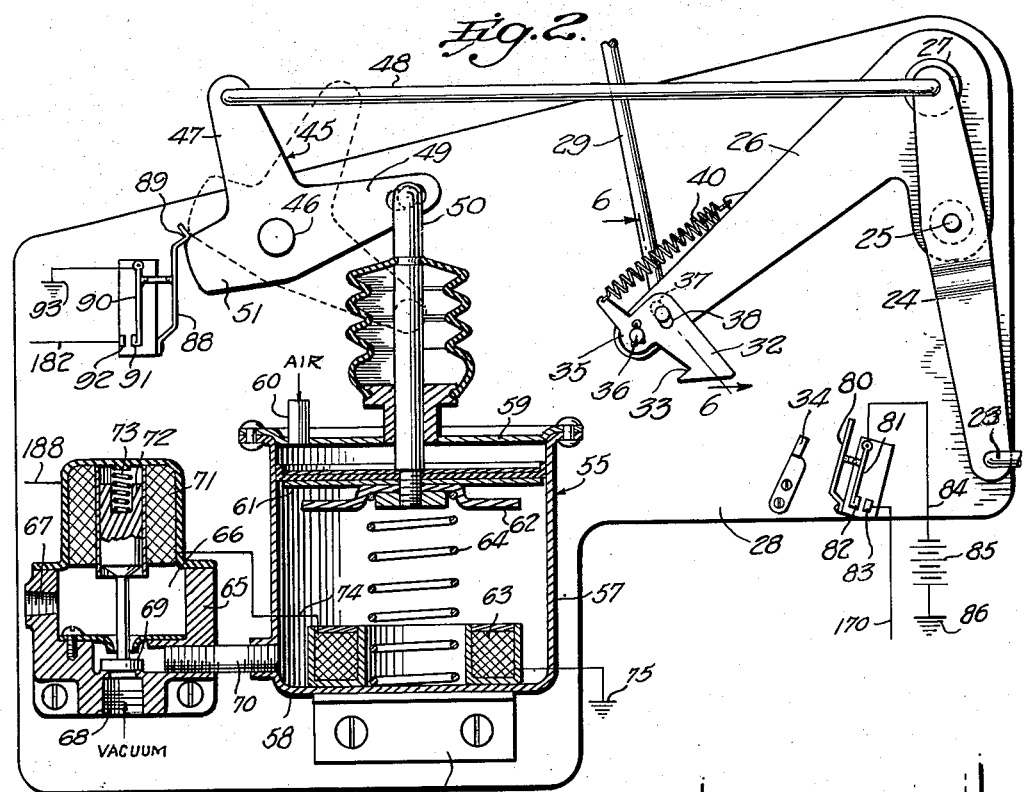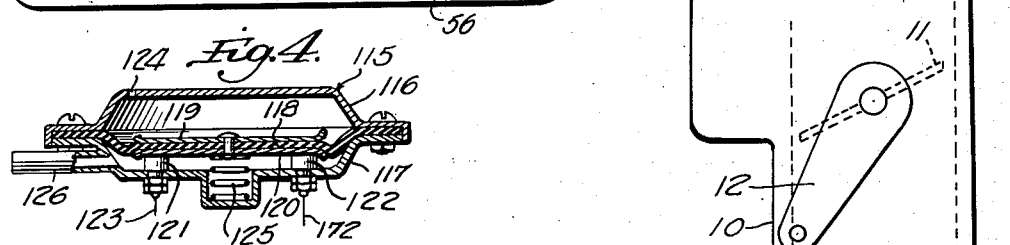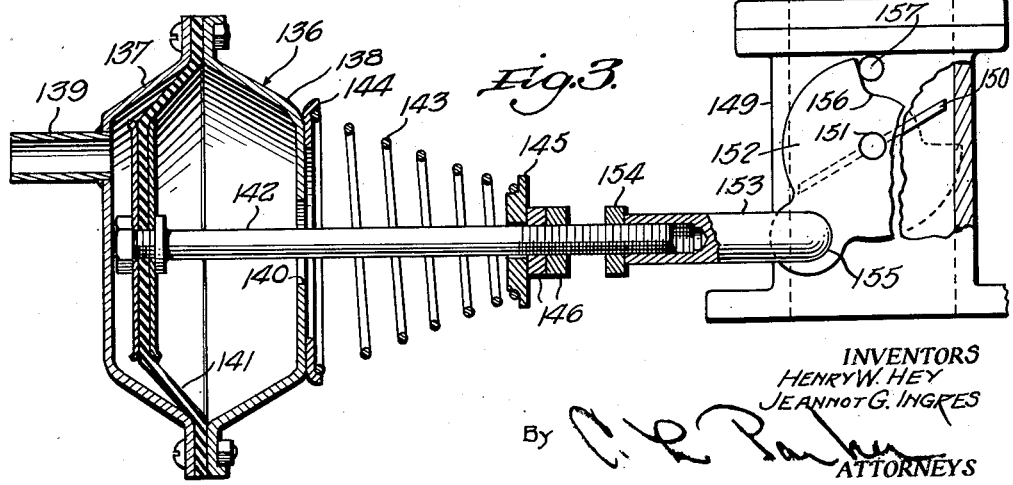

2,568,958

UNITED STATES PATENT OFFICE 2,568,958

GEAR SHIFTING MECHANISM

Henry W. Hey and Jeannot G. Ingres, Richmond, Va., assignors to Automatic Shifters, Inc., Richmond, Va., a corporation of Virginia Application October 14, 1944, Serial No. 558,662

22 Claims. (Cl. 192—.08)

1

This invention relates to transmission shifting mechanisms, and more particularly to a vehicle transmission shifting mechanism wherein the shifting system is combined with an automatic clutch control device to provide automatic, semi-automatic or manual gear shifting in accordance with predetermined conditions or the will of the operator.

It has been proposed to provide power-operated automatic means for shifting a vehicle transmission automatically to provide different gear ratios in accordance with operating conditions, the shift back and forth between relatively high and relatively low gear ratios taking place generally in accordance with vehicle speed. Such mechanisms only partially solve the problems involved in an automatic shifting mechanism. For example, prior mechanisms of this general type provide for back and forth shifting, as stated, whereas it is undesirable to shift from high to low gear except as the operator may desire or determine. Such an automatic shift back into low gear is particularly undesirable in urban traffic inasmuch as vehicle speed constantly shifts back and forth through the predetermined vehicle speed at which shifting normally takes place and it frequently is wholly unnecessary to shift back from high to low gear. Moreover, most mechanisms of this character require some alteration or extra control where it is desirable to wholly manually control the shifting operations.

An important object of the present invention is to provide a novel transmission shifting mechanism wherein the shift from low to high gear takes place automatically under proper predetermined conditions, but wherein the shift from high to low gear is under the control of the operator but without his effecting any shifting operation.

A further object is to provide means for automatically determining when the shift from low to high gear should take place and to complete such shift, and to provide simple means, such as a push button, which may be momentarily operated by the operator to effect a shift back from high to low gear, whereupon the automatic mechanism takes over the control of the system to determine when the shift back into high gear shall occur.

A further object is to provide such an apparatus wherein the automatic shift from low to high gear takes place at a predetermined vehicle speed only if the torque load on the motor is below a predetermined point, and if the torque load is above such point, an automatic torque responsive mechanism comes into operation to prevent the shift into high gear until the torque load on the motor is decreased to the proper point.

A further object is to provide such a transmission shifting mechanism wherein, with no alteration of the automatic mechanism, the operator may manually effect the shifting operations in accordance with conventional practice.

Other objects and advantages of the invention will become apparent during the course of the following description.

In the drawings we have shown one embodiment of the invention. In this showing—

Figure 1 is a schematic representation of the entire shifting mechanism including its connection with the clutch control device, Figure 2 is a side elevation of the power shifting unit, parts being shown in section and certain of the wiring connections being diagrammatically represented, Figure 3 is a sectional view showing the torque reversing device associated with the motor intake pipe, the latter being shown in elevation with a portion broken away, Figure 4 is a detail sectional view showing the torque switch device, Figure 5 is a detail view of the accelerator switch device, and Figure 6 is a detail sectional view on line 6—6 of Figure 2.

Referring to Figure 1 the numeral 10 designates the intake pipe of a conventional motor vehicle engine (not shown) generally connected to the carburetor (not shown) and provided with a throttle valve 11 controlled by arm 12 suitably connected to the accelerator pedal 13. The vehicle includes the usual gear set generally indicated by the numeral 15 and provided with a lever 16 for shifting between what may be termed low and high gears. In this connection, it is well known that several modern types of vehicle transmissions provide only two shiftable forward speeds instead of the older conventional three speeds, an over-drive being provided to which the shift is made automatically from high gear. Transmissions of this type are shown, for example, in the patents to: Frank, 2,390,645, December 11, 1945; and Thompson, 2,285,760, June 9, 1942. The transmission 15 is preferably of such type, and the lever 16 swings in a clockwise direction from the neutral position in Figure 1 into low gear and counterclockwise from neutral position into high gear.

The vehicle also includes a conventional clutch (not shown) and such clutch is operable by a clutch control mechanism generally indicated by the numeral 18 in Figure 1. The clutch control mechanism illustrated is preferably of the type shown in our prior Patent No. 2,365,469, issued December 14, 1944, wherein the releasing of the accelerator pedal effects disengagement of the clutch except when the vehicle is in high gear and travelling above a predetermined speed. The clutch control mechanism further includes a main vacuum control valve and a solenoid energizable for opening such valve to connect the clutch control mechanism to a source of partial vacuum to effect clutch disengagement. A valve corresponding to such valve is diagrammatically represented in Figure 1 and indicated by the numeral 19, and the solenoid energizable for opening such valve is indicated by the numeral 20. Whenever the solenoid 20 is energized, the valve 19 will open and the clutch control motor will operate to disengage the clutch elements. While the present apparatus is used in conjunction with such a clutch control mechanism, the latter forms no part per se of the present invention and accordingly has not been specifically illustrated.

The crank 16 is connected by a rod 23 to a lever 24, and this lever is pivotally connected intermediate its ends as at 25 to one arm of a bell crank lever 26. The latter lever is pivotally connected as at 27 to a carrier plate 28 suitably supported with respect to the transmission. The other arm of the bell crank lever is operatively connected by a rod 29 to a manual shift handle 30. As will become apparent, the handle 30, regardless of the other elements of the apparatus, may be moved to effect shifting of the crank 16 in accordance with conventional practice. Independently of movement of the bell crank lever 26, operation of the crank 16 may be effected by power, in which case the bell crank lever 26 will be moved to and latched in high gear position. Referring to Figure 2, the numeral 32 designates a latch having a shoulder 33 engageable with a stationary post 34 carried by the plate 28. The latch 32 has an enlargement 35, and a pin 36 pivotally connects one end of such enlargement to the bell crank lever 26. The lower end of the rod 29 turns to extend through the latch 32 and through the lever 26 (Figures 2 and 6). The lever 26 is provided with a slot 37 through which the lower end of the rod 29 extends, and the latch 32 is provided with a similar slot 38 for the same purpose. Normally, the inturned end of the rod 29 seats in the bottom of the slot 37 and in the top of the slot 38, for a purpose to be described. A spring 40 tends to turn the latch 32 in a clockwise direction as viewed in Figure 2, thus tending to keep the top of the slot 38 in engagement with the horizontal end of the lever 29. The latch 32 holds the bell crank lever 26 in its normally high gear position but is manually releasable upon an upward pull of the rod 29, as will be apparent later.

A second bell crank lever 45 is pivotally connected as at 46 to the plate 28 and has one arm 47 connected by a rod 48 to the upper end of the lever 24. The other arm 49 of the lever 45 is connected to a power-operated rod 50 whereby the lever 45 is turned on its axis 46 to effect gear shifting operations of the lever 24. The lever 45 is provided with a projection 51 for a purpose to be described.

A fluid pressure operated motor indicated as a whole by the numeral 55 is secured by a bracket 56 to the plate 28 and comprises a cylinder 57 having one end closed as at 58 and its other end capped as at 59. This cap is provided with a nipple 60 to which is preferably connected any suitable type of air cleaner.

The rod 50 extends through the cap 59 and carries a piston 61 beneath which is arranged a plate 62 serving as an armature for an electromagnet 63 mounted in the bottom of the motor 55. A spring 64 urges the piston 61 upwardly, and it will become apparent that such movement turns the bell crank lever 45 in a counterclockwise direction to the position shown in Figures 1 and 2, in which case, assuming the bell crank lever 26 to be latched in high gear position, the crank 16 will be in its high gear position. Connection of the lower end of the motor 55 to a source of vacuum establishes differential pressures on opposite sides of the piston 61 to move the latter downwardly and rock the bell crank lever 45 to effect a shift of the transmission into low gear. This operation will be referred to in detail later.

A valve body 65 is provided therein with a chamber 66 having an air port 67 also preferably connected to a suitable air cleaner. The bottom of the valve body is provided with a vacuum port 68 suitably connected to the intake manifold of the motor vehicle engine, and a poppet valve 69 controls communication of the chamber 66 and port 68 with the lower end of the motor cylinder 57 through a pipe 70. A solenoid 71 is arranged on the top of the valve body 65 and is provided with an armature 72 urged downwardly by a spring 73. The solenoid 71 and electromagnet 63 are connected in series by a wire 74, and the other end of the magnet 63 is grounded as at 75.

Two control switches are carried by the plate 28 as shown in Figures 1 and 2. When the latch 32 is engaged with the stop 34, the point of the latch engages a spring arm 80 to move a switch arm 81 and bring the contact 82 thereof into engagement with a stationary contact 83. The switch arm 81 is connected by a wire 84 to one terminal of a battery 85, and the other terminal of such battery is grounded as at 86.

The other switch carried by the plate 28 comprises a spring arm 88 having a projecting portion 89 engageable by the projection 51 of the bell crank lever 45. In the high gear position of the bell crank lever 45, the projection 51 is below the projecting portion 89 of the arm 88 and is arranged thereabove when the lever 45 is in low gear position. Any slight movement of the projection 51 at the initiation of a gear shifting operation of the lever 45 will move the spring arm 88 to transmit movement to a switch arm 90 to bring the contact 91 thereof into engagement with a stationary contact 92. The switch arm 90 is grounded as at 93.

A clutch control switch is associated with the accelerator to provide for declutching when the engine is idling, under certain conditions. A spring arm 95 has one end 96 engageable upon a flattened portion 97 of a cam plate 98 pivotally supported as at 99 and provided with an operating portion 100. The cam plate is connected by a rod 101 to the accelerator pedal 13, which is shown in Figure 1 in the released or engine-idling position. The spring arm 95 is connected to a switch arm 102 the contact 103 of which engages a stationary contact 104 when the accelerator pedal is in idling position, and when such pedal is depressed, the cam plate 98 is rocked to lift the free end of the spring arm 95 and thus raise the switch arm 102 to disconnect the contact 103 from the contact 104.

Certain functions of the apparatus are controlled in accordance with vehicle speed, and to this end, a conventional governor 108 is driven from any desired part of the vehicle and controls a switch arm 109 having a contact 110 at the end thereof engageable with a contact 111 when the vehicle speed is below a predetermined point, for example, 17 miles per hour. When such speed is exceeded, the governor moves the arm 109 upwardly to engage the contact 110 with a second stationary contact 112. The switch arm 109 is grounded as at 113.

As will become apparent, the governor 108 operates to provide for the shift from low to high gear when the vehicle speed is accelerated to the point for which the governor is set, provided, however, that the torque load on the motor is not excessive. In the latter case, the circuits to be described which are normally closed by the governor through the contact 112 will be prevented from being closed by a torque switch device 115 shown in Figure 4. This device comprises casing sections 116 and 117 between which is clamped a diaphragm device 118. The central portion of the diaphragm is suitably clamped between stiffening plates 119 and 120 the lower of which is engageable with contacts 121 and 122. A wire 123 connects the governor contact 112 with the contact 121 of the torque switch. The casing section 116 is vented to the atmosphere as at 124 and a spring 125 urges the diaphragm 118 upwardly. A vacuum pipe 126 is connected to the lower casing section 117 and is tapped into the vehicle intake manifold, or into one of the pipes leading thereto as will be apparent. When the torque load on the motor is excessive, relatively reduced differential pressures will exist on opposite sides of the diaphragm 118, in which case the spring 125 will disengage the plate 120 from the contacts 121 and 122, thus preventing the closing of a control circuit through the governor contact 112, as will be fully described below.

The clutch control mechanism 18 has a pipe connection 130 leading to the intake manifold and has an outlet 131 suitably piped as at 132 to a clutch control motor diagrammatically illustrated in Figure 1 and indicated by the numeral 133. The pipe 132 has a branch pipe 135 leading to a torque reverser indicated as a whole by the numeral 136 shown in detail in Figure 3. This device comprises a pair of casing sections 137 and 138 the former of which is connected as at 139 to the branch pipe 135. Accordingly, the pressure within the chamber 137 will correspond to that of the low pressure side of the clutch control motor 133. The casing 138 is vented to the atmosphere as at 140, and a diaphragm 141 is clamped between the casing sections 137 and 138 and carries a rod 142 projecting substantially from the casing 138 through the opening 140. A spring 143 engages a seat 144 carried by the casing 138, and the other end of the spring engages a seat 145 surrounding the rod 142 and adjustable therealong by nuts 146.

The intake pipe 10 (Figure 3) is provided with a section 149 inserted ahead of the carburetor and containing a butterfly valve 150 similar to the throttle valve and mounted on a shaft 151 carrying a plate 152 arranged externally of the pipe section 149. An extension 153, threaded on the rod 142 and fixable in adjusted position thereon by a jamb nut 154, is connected as at 155 to the plate 152. This plate is arcuately cut away as at 156 for engagement with a stop pin 157 to limit turning movement of the plate 152, and consequently of the butterfly valve 150. Accordingly the valve 150 is limited in one direction to a position corresponding to the idling position of the throttle 11, and in its other direction to a position in axial alinement with the pipe section 149. Whenever the clutch control motor is energized to disengage the clutch, the same differential pressures will be established on opposite sides of the diaphragm 141 to move the butterfly valve 150 to its "closed" or operative position shown in Figure 3, which has the effect of partially "choking" the vehicle motor to reverse the torque load on the gears of the transmission to facilitate a shifting operation.

The device further comprises a pair of associated electrical control devices respectively indicated as a whole by the numerals 160 and 161. The device 160 comprises an electromagnet 162 the armature 163 of which is biased away from the magnet to engage a contact 164. Energization of the magnet 162 obviously breaks the circuits to be described at the contact 164. The control device 161 is substantially identical with the device 160 and comprises an electromagnet 166 having an armature 167 biased away from the magnet for engagement with a contact 168.

The various electrical devices referred to are connected in a novel manner to provide the necessary control circuits. The stationary contact 83 associated with the bell crank lever 26 is connected to one end of a wire 170 and this wire is branched for connection with the armature 163 and with one end of the winding of the electromagnet 162. The other end of the winding of this electromagnet is tapped by a wire 171 into a wire 172, one end of which leads to the contact 168 of the device 161 and the other end of which is connected to the contact 122 of the torque switch. From the contact 121 of the torque switch, the wire 123 leads to the high speed contact 112 of the governor, as previously stated. The contact 111 of the governor is connected by a wire 175 to the stationary contact 104 of the accelerator switch, and a wire 176 is tapped into the wire 175 and leads to a switch arm 177 carried by the transmission 15 and engageable with a stationary contact 178 grounded as at 179. The switch arm 177 is connected to a spring arm 180 engageable by the crank 16 to break the circuit at the contact 178 when the crank 16 is in the high gear position. When the crank is in low gear, it will be obvious that the wire 175 will be connected to ground 179 regardless of the governor switch.

The switch arm 102 of the accelerator switch is connected by a wire 182 to the stationary contact 92 (Figure 2) and as stated, this contact is engageable by the switch arm 90 which is grounded as at 93. The wire 182 is tapped by a wire 183 leading to one terminal of the clutch control solenoid 20. The other terminal of the solenoid 20 is connected to a source of current 184 having its other terminal grounded as at 185. It will become apparent that the governor switch 109, transmission switch 177 and the switch 90 (Figure 2) are in parallel and the closing of either of such switches, as determined by the conditions present at a given time, will energize the solenoid 20 to open the valve 19 and thus connect the clutch control motor to the source of partial vacuum.

As previously stated, the electromagnetic devices 63 and 71 of the power shifting unit are connected in series by the wire 74 while one terminal of the magnet 63 is grounded as at 75. The other terminal of the magnet 71 is connected by a wire 188 to one end of the magnet 166, and the other end of this magnet is grounded as at 189. A wire 190 is tapped into the wire 188 and leads to the stationary contact 164 of the control device 160.

As previously stated, the armature 167 of the control device 161 is normally engageable with the contact 168, and the armature 167 is connected by a wire 192 to a contact 193 arranged in the shift handle 30 and normally engaged by a contact 194 grounded at 195 and operable by a push button 196 to break the circuit across the contacts 193 and 194.

The operation of the apparatus is as follows:

The gear shift handle 30 is diagrammatically represented as being pivoted for movement between low and high gears, but it will be apparent that the shift handle will conventionally provide for the necessary shift into reverse. The latter shift, since it has no bearing on the present system, may be disregarded. Assuming that the operator is ready to start the vehicle, the shift handle 30 will be placed in neutral position and the engine will be started. Preparatory to performing the shifting operation, the operator will release the accelerator to idling position, in which case the switch 102 (Figure 5) will be closed with the contacts 103 and 104 in engagement with each other. Under such conditions current will flow from the source 184 through solenoid 20 and wire 183, and thence through the switch 102 and wire 175 which, under the conditions being considered, will be grounded at two points, namely, at the points 113 and 179. In this connection it will be noted that when the gear shift crank 16 is in any position other than high gear, the switch 177 will be closed. Moreover, when the vehicle is stationary, the switch contact 110 of the governor will engage the contact 111. Therefore, the solenoid 20 will be energized to open the vacuum valve 19 and thus connect the source of vacuum to the clutch control motor 133 through pipes 130, 131 and 132. Accordingly the clutch will be disengaged ready for the shifting operation. In connection with the clutch control mechanism 18, attention is invited to the fact that the form of such mechanism shown in prior Patent No. 2,365,469, granted December 14, 1944, referred to above is preferably employed. Such a mechanism includes a solenoid operable valve which may be opened whenever the solenoid is energized to connect the clutch control motor to the source of partial vacuum.

The motor having been started and the clutch disengaged, the operator will manually move the shift handle 30 downwardly as viewed in Figure 1 to the high gear position, and it will become apparent that the handle 30 is left in such position for all automatic and semi-automatic shifts. Such movement of the handle 30 swings the bell crank lever 26 in a counterclockwise direction about its pivot 27 to move the crank 16 to high gear position, such operation resulting in engagement of the crank 16 with the spring arm 180 to open the switch 177. So long as the shift crank 16 is in high gear position the switch 177 can never function to close a circuit through the clutch control solenoid 20. This is important since it is desired to prevent clutch disengagement upon each releasing of the accelerator pedal 13 when the transmission is in high gear, which otherwise would occur since the releasing of the accelerator pedal closes the switch 102 as shown in Figure 5. In low gear, the switch 177 will be closed and grounded as at 179 and each releasing of the accelerator pedal will effect declutching.

The operation of the bell crank lever 26 to shift into high gear takes place with the rod 48 stationary, and the lever 24 has its upper end fixed against movement so that movement of the bell crank lever 26 moves the pivot point 25 toward the right in Figure 1 to transmit similar movement to the rod 23 to shift the crank 16 to high gear position. When the bell crank lever 26 approaches a corresponding position, the inclined edge of the latch 32 (Figure 2) will slide over the stop or post 34 and then drop to normal position with the shoulder 33 engaging the stop 34. The spring 40 urges the latch into engagement with the stop 34 when the high gear position of the lever 26 is reached. In this connection it will be noted that when the rod 29 moves downwardly, it engages the bottom of the slot 37 to move the lever 26, and since the lower end of the rod 29 is in the top of the slot 38, the latch 32 is free to swing in the manner described to assume its operative latched position.

Current will now flow from the source 85 through switch 81, wire 170, magnet 162, wires 171 and 172 (upper branch), through switch 167, wire 192, across contacts 193 and 194 and thence back to the source through grounds 195 and 86. Immediately upon the shift into high gear, therefore, the magnet 162 will be energized to attract its armature 163, thus disconnecting it from the stationary contact 164, and the devices dependent for energization on the contact 164, namely, the magnet 166 and the electromagnetic devices of the power shifting unit will remain deenergized.

It is desirable, of course, to start the vehicle moving in low gear whereas the previous operations will have placed the gear set in high gear. Accordingly the operator will momentarily depress the button 196 on the shift handle, thus breaking the circuit across the contacts 193 and 194. This breaks the previously described circuit through magnet 162 and the armature 163 thereof will move upwardly to engage the contact 164. Current will now flow from the source 85 through switch 81, wire 170, switch 163, wire 190 and wire 188 (lower branch), thence through magnet 166 and back to the source through grounds 189 and 86. The magnet 166 will be energized to attract its armature 167 and move it out of engagement with the contact 168 on which the circuit for the magnet 162 is dependent. Therefore, momentary pressing of the button 196 will break the circuit through the magnet 162 and will simultaneously energize the magnet 166 to prevent the completion of the circuit through magnet 162 when the button 196 is released. The device 161 accordingly acts as a holding device to keep the circuit through magnet 166 broken upon a momentary depression of the push button 196. This circuit remains broken pending completion of the operations to be referred to.

The engagement of the switch arm 163 with the contact 164 also completes a circuit through the magnetic devices of the power shifting unit from the source 85 to the wire 190 in the manner described, thence through wire 188 (upper branch), through solenoid 71 and magnet 63 (Figure 2) and back to the source through grounds 75 and 86. Energization of the solenoid 71 moves the valve 69 upwardly to connect the vacuum port 68 to the pipe 70 whereby air will be exhausted from the cylinder 57 to move the piston 61. This piston will then move downwardly until the plate 62 is brought into magnetic engagement with the magnet 63 and the latter acts to hold the piston 61 in its lower position, regardless of fluctuations which may occur in intake manifold pressure, until the circuit through the magnet 63 is broken in a manner to be described.

Downward movement of the piston 61 rocks the bell crank lever 45 to transmit movement to the upper end of the lever 24. With the bell crank lever 26 remaining stationary in its high gear latched position, the lever 24 will be rocked in a clockwise direction about its pivot 25 and the shift crank 16 will be moved in a clockwise direction (Figure 1) to shift into low gear. The operator will now depress the accelerator pedal 13 and this operation immediately rocks the cam plate 98 (Figures 1 and 5) to lift the spring arm 95 and break the circuit at the contact 103. The circuit for the clutch control solenoid 20 will be broken at the contact 103, and since the projection 51 (Figure 2) releases the spring arm 88 when in any gear position, the circuit across contacts 91 and 92 will be broken. All of the parallel circuits for the solenoid 20 accordingly will be broken and the valve 19 will close, thus cutting off direct communication between the clutch control motor and the intake manifold. Depression of the accelerator pedal will accelerate the vehicle motor and will operate the clutch control mechanism to control clutch engagement in the proper manner, for example, as disclosed in our prior Patent No. 2,365,469, referred to above.

Vehicle acceleration will then increase to the point at which the governor 108 is set to operate the switch arm 109 to transfer it from engagement with the contact 111 to engagement with the contact 112. It will be assumed that the operator will not release the accelerator pedal, in which case the only available circuit for closing the circuit through the clutch control solenoid 20, namely, the transmission switch 177, will be prevented from closing since the accelerator switch 102 will remain open. As soon as the governor speed is reached, a control circuit will be completed across contacts 110 and 112.

Current will flow from battery 85, through switch 81, wire 170, magnet 162, wire 172 (lower branch), through the torque switch (Figure 4), contact 112, switch 109 and back to the source through grounds 113 and 185. Regardless of the position of the armature switch 167, the magnet 162 thus will be energized to attract its armature 163 and thus break the circuits through the branched wire 188, through magnet 166 and through the electromagnets of the power shifting device (63 and 71). The breaking of the circuit through magnet 166 releases the switch arm 167 to reset it for the next operation. The breaking of the circuit through the magnetic devices of the power shifting unit drops the valve 69 on its lower seat to disconnect the motor 55 from the source of vacuum and to admit air into the bottom of the motor cylinder 57, and releases the armature plate 62. The spring 64, which is tensioned to effect a gear shifting operation into high gear, will then force the piston 61 upwardly to tend to turn the bell crank lever 45 in a counterclockwise direction to similarly rock the lever 24 and shift the crank 16 into high gear position.

It will be remembered that since no circuit will be completed through the clutch control solenoid 20, the clutch will be in engagement. However, initial movement of the bell crank lever 45 (Figure 2) causes the projection 51 to move the spring arm 88 and close the switch 90. Current will instantaneously flow from the source 184 through wires 183 and 182, across contacts 92 and 91 (Figure 2), through switch 90 and back to the source through grounds 93 and 185. The valve 19 thus will be opened to connect the clutch control motor 133 to the source of vacuum and disengage the clutch to permit the shifting operation to proceed. In order to relieve the load from the gears to facilitate the shifting operation, the torque reverser comes into operation simultaneously with the connection of the clutch control motor with the source of vacuum. Referring to Figure 1 it will be noted that the casing 137 of the torque reverser is connected by the pipe 135 to pipe 132 and the operation of the valve 19 accordingly results in exhausting air from the casing 137, (Figure 3) whereupon air acting on the diaphragm 141 moves the latter to the left to swing the butterfly valve 150 to its operative position as shown in Figure 3. This operation has the same effect as the conventional movement of the throttle valve 11 to idling position, momentarily partially "choking" the motor and reversing the torque in the transmission. This occurs simultaneously with the releasing of the clutch, and these operations occur upon initial movement of the bell crank lever 45 (Figure 2). Immediately upon the flowing of air into the bottom of the motor cylinder 57, therefore, the clutch will be disengaged, and the motor torque reversed, whereupon the spring 64 can complete the shift into high gear.

During such shifting operation, the projection 51 (Figure 2) will hold the switch 90 in closed position. As soon as high gear position is reached, however, as shown in dotted lines in Figure 2, the spring arm 88 will be released and the switch 90 will open, thus breaking the circuit through the solenoid 20 to cut off the clutch control motor and the torque reverser from the source of vacuum. The clutch will be immediately engaged, and the butterfly valve 150 (Figure 3) will be open to restore the controlling of the vehicle engine to the throttle 11.

From the foregoing it will be apparent that the gear set will remain in low gear until a predetermined vehicle speed is reached, as determined by the setting of the governor 108, whereupon the shift into high gear will take place automatically (except as referred to below) without any attention on the part of the operator and without his having even to release the accelerator pedal. In other words, the operator need not even be aware of the establishment of the conditions under which automatic shifting takes place. However, it will be apparent that all driving conditions do not justify a shift into high gear at the same vehicle speed, it being advisable that the shift be prevented if the torque load on the motor is excessive. The torque switch 115 takes care of such condition. Assuming that the vehicle is climbing a substantial grade, or is heavily loaded, or assuming that the apor
the operator accelerates the vehicle at a relatively high rate, the torque load may be such as to render the shift into high gear inadvisable when the governor functions to connect the contacts 110 and 112. Under such conditions, relatively high pressure will exist beneath the diaphragm 118 (Figure 4) and the spring 125 will overcome differential pressures on opposite sides of the diaphragm 118, thus moving the plate 118 out of engagement with the contacts 121 and 122. These contacts being in series with the governor contacts 110 and 112, the latter cannot function to cause the automatic shifting operation to take place at the set governor speed if the torque load is excessive. The plate 120 will remain out of engagement with the contacts 121 and 122 until the torque load is reduced to the point which makes shifting feasible, whereupon the automatic shifting circuit will be completed and the shift into high gear will take place as described.

The present apparatus prevents an automatic shift from high back to second gear. It constantly occurs in heavy traffic that a vehicle, in high gear, will accelerate and decelerate through the set governor speed and if automatic shifting were to take place from high to low gear as it does from low to high gear, there would be frequent and wholly unnecessary shifting under the conditions referred to. The set governor speed preferably exceeds the minimum high gear vehicle speed, and the operator can easily decelerate below the governor speed and then again accelerate without having to shift into low gear, and the function of the present apparatus to prevent an automatic shift from high to second gear accordingly is highly desirable.

However, it is desirable to permit the operator with minimum effort to shift into low gear when desired, and this is accomplished in the present apparatus merely by tapping or momentarily pressing the button 196 without moving the gear shift lever 30, movement of such lever being wholly unnecessary. The momentary depressing of the button 196 repeats the operation previously described with relation to the initial placing of the handle 30 in high gear position followed by the pressing of the button 196 to shift into low gear. A description of such operation need not be repeated, and it will be obvious that the operator, at any time, may shift into low gear merely by momentarily pressing the button 196. Such operation will take place regardless of any releasing of the accelerator pedal to effect declutching since the breaking of the circuit at the contacts 193 and 194 breaks the circuit through magnet 162 to engage the switch arm 163 with the contact 164 and this operation energizes the magnetic devices of the power shifting unit to start downward movement of the piston 61 (Figure 2) in the manner previously described. Initial movement of the bell crank lever 45 closes the switch 90 in exactly the same manner as described for the shift from low to high gear, the projection 51 of the lever 45 engaging the spring arm 88 to close the switch 90 and thus close the circuit previously described through the clutch control solenoid 20. Therefore, the operator, by merely pressing the button 196 momentarily, will declutch and simultaneously reverse the motor torque, whereupon the bell crank lever 45 will be turned in a clockwise direction to turn the lever 24 and shift the crank 16 into low gear position. As soon as the conditions which made the shift into low gear advisable have passed, the shift will automatically take place back into high gear in the manner previously described. Thus the present apparatus provides for an automatic shift from low to high gear whenever the conditions justify such shift, taking into account vehicle speed and torque loads, and that a shift back into second gear may be provided at any time under the will of the operator merely by momentarily depressing the button 196.

Another advantage of the present apparatus lies in the fact that shifting may be accomplished manually without making any changes whatever in the apparatus. If manual shifting is to be resorted to, it merely is necessary for the operator to ignore the push button 196 and move the shift lever 30 in the conventional way. Under such conditions the elements of the power shifting unit and the lever 45 will remain stationary and movements of the handle 30 will rock the lever 26 to transmit movement to the lever 24 through the pivot pin 25, the lever 24 having its fulcrum at the point of connection of the upper end of the lever 24 with the rod 48. Such point will remain relatively stationary as movements are transmitted from the handle 30 to the lever 26 and thence through lever 24 and rod 23 to the crank 16.

In connection with manual shifting attention is invited to the fact that the latch 32 (Figure 2) in the automatic shifting operations referred to, holds the switch 81 closed and assists in maintaining the bell crank lever 26 in the proper position for operation of the lever 24 about the pivot 25 for power shifting. For manual shifting, the latch 32 is readily releasable from the stop 34. Referring to Figure 2 it will be seen that when the operator desires to shift out of high gear, he will move the handle 30 upwardly as viewed in Figure 1 to similarly move the rod 29. The lower end of this rod is normally in the top of the slot 38 and in the bottom of the slot 37. Accordingly initial upward movement of the rod 29 will first effect movement of the latch 32 to swing it in a counterclockwise direction and release the shoulder 33 from the stop 34. Immediately upon the completion of such operation, the rod 29 will come into engagement with the top of the slot 37 and further movement of the rod 29 will operate the lever 26 to transmit movement to the lever 24 through the pivot pin 25. In other words, initial movement of the rod 29 will move the latch 32 out of engagement with the stop 34, whereupon further movement will swing the bell crank lever 26 into low gear position. Thus it will be apparent that the operator is free to swing the lever 26 manually while the lever 45 remains stationary to effect the shift from high to low gear. Similarly, with the lever 45 remaining stationary, the operator may manually move the handle 30 for the shift into high gear, such manual shifting movement again transmitting movement to the lever 24 through the pivot 25. Obviously, the operator may make the manual shifts without changing or setting anything concerned with the automatic shifting mechanism, and in fact without even having any knowledge of the presence of the automatic shifting means.

In connection with manual shifting, attention is invited to the fact that the switch 177 functions to effect declutching when the accelerator is released with the gear set in low gear. Assuming that the operator has shifted into low gear and has accelerated the vehicle to the point where he desires to shift into high gear he will release the accelerator pedal in accordance with conventional practice, and a circuit through the solenoid 20 will be closed from the source 184 through wire 183, switch 102, wires 175 and 176, switch 177 and thence back to the source through grounds 179 and 185. The clutch will be disengaged as previously described, whereupon the manual shift may be made into high gear and the operator will again depress the accelerator pedal.

The shift having been made into high gear, the crank 16 will open the switch 177 and thus make it impossible, so far as this switch is concerned, to effect declutching by releasing the accelerator pedal. However, whenever the vehicle speed is below the governor speed, the parallel circuit through wire 175, contacts 111 and 110 and ground 113 will be completed upon the releasing of the accelerator pedal, in which case declutching will take place. With the vehicle in high gear and travelling above the governor speed, the accelerator may be released without declutching, thus permitting the motor vehicle engine to be used as a brake in vehicle deceleration, the clutch remaining engaged until decelaration has taken place to a point below the governor speed, whereupon the clutch will be automatically disengaged if the accelerator pedal has been permitted to remain in released position.

From the foregoing it will be obvious that with relatively simple electrical control devices, the present mechanism provides for an automatic shift from low to high gear merely by initially placing the shift handle 130 in high gear position and by depressing the button 196. The apparatus also prevents the disadvantageous automatic shifting from high to low gear, but permits the operator to set the system for such a shift by again merely momentarily depressing the button 196. The shift will thereafter take place automatically into high gear when such operation is justified by operating conditions. The system also permits conventional manual shifting without any changes in the automatic system and, in fact, without any knowledge on the part of the operator that the automatic system is present, except that he merely avoids pressing the button 196. In connection with manual shifting, it will be noted that so long as the push button 196 remains undisturbed, with the shift handle 30 in high gear position, the circuit through the magnet 162 will be closed to hold the switch 163 in open position, and thus prevent the flowing of current through the electro-magnetic devices 63 and 71 of the power shifting mechanism. When a manual shift is made into low gear, the circuit will be broken between switch 81 and contact 83 to deenergize the magnet 162, but at the same time no current will flow through wire 170 and, of course, the circuit through the magnetic devices of the power shifting unit cannot be closed. Thus it will be apparent that the manual shifts may be made without any of the automatic electrically-controlled operations taking place.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A transmission shifting mechanism for a motor vehicle having a member shiftable between high and low gear positions, a clutch-disengaging motor, and a control device for energizing said motor, and a vehicle-speed controlled governor, comprising a power device connected to said shiftable member, manually controlled means for rendering said power device operative to move said shiftable member to low gear position, clutch-controlling means operable by said power device substantially throughout a movement of said shiftable member from one position to another for rendering said control device effective for energizing said clutch-disengaging motor and releasable when said shiftable member reaches either of said positions to engage the clutch, and means operable by the governor when said shiftable member is in low gear position and the vehicle speed has accelerated to a predetermined point for rendering said power device operative for moving said shiftable member to high gear position, said last named means comprising an electric circuit including a switch controlled by the governor.

2. A transmission shifting mechanism for a motor vehicle having a member shiftable between high and low gear positions, a clutch-disengaging motor, and a control device for energizing said motor, and a vehicle-speed controlled governor, comprising a power device, motion transmitting connections between said power device and said shiftable member, manually controlled means for operating said power device to move said shiftable member to low gear position, clutch controlling means having an element arranged in the path of travel of a portion of said motion transmitting connections and operable thereby substantially throughout movement of said shiftable member from either of its positions to the other position for operating said control device to energize said motor and disengage the clutch and for releasing the clutch when either position of said shiftable member is reached, and means operable when said shiftable member is in low gear position and the vehicle speed has accelerated to a predetermined point for rendering said power device operative for moving said shiftable member to high gear position, said last named means comprising an electric circuit including a switch controlled by the governor.

3. A transmission shifting mechanism for a motor vehicle having a member shiftable between two positions to provide different gear ratios, a clutch-disengaging motor, and a control device for said motor including an electro-magnetic device energizable to operate the control device to operate the motor, comprising a power device for operating said shiftable member, means for controlling said power device, a second means operable by said power device for energizing said electro-magnetic device whereby initial operation of said power device to move said shiftable member from one gear position will effect operation of said clutch-disengaging motor and maintain the clutch disengaged until the other gear position of said shiftable member is reached, and means for preventing operation of said second means when said shiftable member is in one of its said positions.

4. Apparatus constructed in accordance with claim 3 provided with motion transmitting means connecting said motor to said shiftable member, the means for preventing operation of said second means comprising a switch device arranged in the path of travel of and operable by said motion transmitting means.

5. A transmission shifting mechanism for a motor vehicle having a member shiftable between high and low gear positions, a clutch-disengaging motor, a control device for said motor including an electromagnetic device energizable to operate the control device to operate the motor, and a vehicle-speed controlled governor, comprising a power device for operating said shiftable member, means operable by said power device except when said shiftable member is in one of its said positions for energizing said electromagnetic device whereby initial operation of said power device to move said shiftable member from one gear position will effect operation of said clutch-disengaging motor and maintain the clutch disengaged until the other gear position of said shiftable member is reached, manually controlled means for effecting operation of said power device when said shiftable member is in high gear position to move it to low gear position, and means controlled by said governor when said shiftable member is in low gear position and the vehicle accelerates to a predetermined speed for effecting operation of said power device to move said shiftable member to high gear position, said last named means comprising an electric circuit including a switch operable by the governor.

6. Apparatus constructed in accordance with claim 5 provided with manually operable means, including a handle, for moving said shiftable member independently of said power device.

7. Apparatus constructed in accordance with claim 5 provided with manually operable means, including a handle, for moving said shiftable member independently of said power device, the means for effecting operation of said power device when said shiftable member is in high gear position to move it to low gear position, comprising a manually operable element carried by said handle.

8. A transmission shifting mechanism for a motor vehicle having a member shiftable between high and low gear positions, a clutch disengaging motor, and a vehicle-speed controlled governor, comprising a power device connected to said shiftable member to move it between said gear positions, means inoperative when said shiftable member is in either gear position and operative throughout movement of such member between said gear positions for operating said motor to maintain the vehicle clutch disengaged, manually controlled means for rendering said power device operative to move said shiftable member to low gear position, means normally operable by the governor when the shiftable member is in low gear position and the vehicle speed has accelerated to a predetermined point for rendering said power device operative for moving said shiftable member to high gear position, said last named means comprising an electric circuit including a switch operable by the governor, and means for rendering said last named means inoperative when the torque load on the vehicle engine is relatively excessive when the vehicle speed has accelerated to said predetermined point.

9. A transmission shifting mechanism for a motor vehicle having a member shiftable between high and low gear positions, a clutch disengaging motor, and a vehicle-speed controlled governor, comprising a power device connected to said shiftable member to move it between said gear positions, means inoperative when said shiftable member is in either gear position and operative throughout movement of such member between said gear positions for operating said motor to maintain the vehicle clutch disengaged, manually controlled means for rendering said power device operative to move said shiftable member to low gear position, means comprising an electric circuit having a switch operable by the governor when said shiftable member is in low gear position and the vehicle speed has accelerated to a predetermined point for rendering said power device operative for moving said shiftable member to high gear position, said circuit comprising a second switch, and means responsive to the torque load on the vehicle engine for operating said second switch to prevent operation of said power device when the vehicle speed has accelerated to said predetermined point if the torque load on the vehicle engine is relatively excessive.

10. A transmission shifting mechanism for a motor vehicle having a member shiftable between high and low gear positions, and a vehicle-speed controlled governor, comprising a power device for operating said shiftable member, control means for said power device, a manually operable element for setting said control means for an automatic operation of said power device to move said shiftable member from low to high gear positions, electric circuit means for determining the operativeness of said control means and comprising a pair of switches in series, one of said switches being movable to closed position by the governor when the vehicle speed reaches a predetermined point to render said control means operative in accordance with the setting thereof by said manually operable element and the other switch being normally closed, and means responsive to the torque load on the vehicle engine for opening said other switch when such torque load is above a predetermined point.

11. A transmission shifting mechanism for a motor vehicle having a member shiftable between high and low gear positions, and a clutch-disengaging motor, comprising a power device for operating said shiftable member, control means for said power device including an electromagnetic device and a switch in the circuit of said electromagnetic device, said switch being biased to closed position, a normally closed manually controlled circuit for holding said switch in open position to prevent operation of said power device, said normally closed circuit having a manually operable switch therein for opening said circuit to release said first named switch to effect operation of said power device, and means operative during movement of said shiftable member by said power device from one gear position to another for operating said clutch-disengaging motor to maintain the clutch disengaged until a gear position of said shiftable member is reached.

12. Apparatus constructed in accordance with claim 11 wherein said last named means comprises an electromagnetic device energizable to operate said clutch-disengaging motor and having a circuit including a switch arranged to be closed upon initial operation of said power device from one gear position and to be held closed only until the other gear position is reached.

13. A transmission shifting mechanism having a member shiftable from one position to another to provide different gear ratios, a clutch disengaging motor, and an intake pipe for the vehicle engine, comprising a power device for operating said shiftable member, means for energizing said power device to move said shiftable member, means operable by said power device upon initial operation thereof for effecting operation of said clutch-disengaging motor and for maintaining such operation until the other gear position of said shiftable member is reached, and means controlled by said last named means for restricting the flow of fuel through said intake pipe during operation of said clutch-disengaging motor.

14. A transmission shifting mechanism having a member shiftable from one position to another to provide different gear ratios, a clutch disengaging motor, and an intake pipe for the vehicle engine, comprising a power device for operating said shiftable member, means for energizing said power device to move said shiftable member, means operable by said power device upon initial operation thereof for effecting operation of said clutch-disengaging motor and for maintaining such operation until the other gear position of said shiftable member is reached, a throttling valve in said intake pipe, and a motor connected to said throttling valve and energizable for moving such valve to a position restricting the flow of fuel through said intake pipe, said last named motor being connected to said clutch-disengaging motor to be energized simultaneously therewith.

15. A transmission shifting mechanism for a motor vehicle having a member shiftable between two positions to provide different gear ratios, a differential pressure operated clutch-disengaging motor, and a control device for said motor including a valve controlling communication of said motor with a pressure source and an electromagnetic device for opening said valve, comprising a power device for operating said shiftable member, means operable upon initial operation of said power device for energizing said electromagnetic device and maintaining it energized during operation of said power device until the other gear position of said shiftable member is reached, a second differential fluid pressure operated motor communicating with said first named motor to be connected to said source when said valve is opened, and means operative by said second motor for reversing the engine torque load during each period of disengagement of the vehicle clutch.

16. A transmission shifting mechanism for a motor vehicle having a member shiftable between two positions to provide different gear ratios, a differential pressure operated clutch-disengaging motor, and a control device for said motor including a valve controlling communication of said motor with a pressure source and an electromagnetic device for opening said valve, comprising a power device for operating said shiftable member, means operable upon initial operation of said power device for energizing said electromagnetic device and maintaining it energized during operation of said power device until the other gear position of said shiftable member is reached, a valve device for restricting the flow of fuel to the vehicle engine, and a second differential fluid pressure operated motor connected to said valve device and communicating with said first named motor to be energized when said valve is opened to move said valve device to a position restricting the flow of fuel to the vehicle engine to reverse the torque load thereon during the period of disengagement of the vehicle clutch.

17. A transmission shifting mechanism for a motor vehicle having a member shiftable between two positions to provide different gear ratios, comprising a power device, motion transmitting connections between said power device and said shiftable member, said power device having a pressure responsive member and a chamber connectible to a source of differential pressure to move such member in one direction to effect movement of said shiftable member to one gear position, a spring biasing said shiftable member to the other gear position and operative for moving it to such position when said chamber is disconnected from said source, and a manually operable handle connected to said motion transmitting connections, said motion transmitting connections comprising a first lever and a second lever the latter of which is pivotally supported intermediate its ends by said first lever and said ends being connected respectively to said pressure responsive member and to said shiftable member, said first lever having one end connected to said handle and having fixed pivotal support between such end and the point of connection of said second lever with said first lever.

18. A transmission shifting mechanism for a motor vehicle having a member shiftable between two positions to provide different gear ratios, comprising a power device having a pressure chamber and a pressure responsive member therein, motion transmitting connections between said pressure responsive member and said shiftable member, means for connecting said chamber to a source of pressure differential to move said shiftable member to one of its gear positions, a spring operative through said motion transmitting connections when said chamber is disconnected from said source for moving said shiftable member to its other position, said motion transmitting connections comprising a lever pivotally supported intermediate its ends, a second lever pivoted to said first named lever at a point spaced from its pivotal support, said second named lever being connected to said pressure responsive member and to said shiftable member at points spaced from the pivotal connection of said second named lever with said first named lever, and a handle mechanically connected to said first named lever, said levers being constructed as described whereby when said chamber is disconnected from said source, and said spring is holding said second named lever in said other position, movement of said handle will operate said levers to move said shiftable member between its gear positions.

19. A transmission shifting mechanism for a motor vehicle having a member shiftable between two positions to provide different gear ratios, comprising a manually operable handle, motion transmitting means connecting said handle to said shiftable member, a power device connected to said motion transmitting means, and an electric circuit energizable for rendering said power device operative, said circuit comprising a switch arranged to be closed when said handle is in a predetermined position, and a second switch in said circuit for closing it when said handle is in said predetermined position, to energize said power device and effect a movement of said shiftable member from one gear position to the other independently of movement of said handle.

20. A transmission shifting mechanism for a motor vehicle having a member shiftable between two positions to provide different gear ratios, and a clutch disengaging motor, comprising a manually operable handle, motion transmitting means connecting said handle to said shiftable member, a power device connected to said motion transmitting means, an electric circuit energizable for rendering said power device operative, said circuit comprising a switch arranged to be closed when said handle is in a predetermined position, and a second switch in said circuit for closing it when said handle is in said predetermined position, to energize said power device and effect a movement of said shiftable member from one gear position to the other independently of movement of said handle, and means inoperative when said shiftable member is in either gear position and operative throughout a movement of such member between its gear positions for energizing said clutch-disengaging motor to maintain the vehicle clutch disengaged.

21. In a transmission shifting mechanism for a motor vehicle having a clutch and a transmission provided with a member shiftable between two positions to provide different gear ratios, the combination of a clutch disengaging motor, a power device for operating said shiftable member, means for controlling said power device, and means operable by said power device except when said shiftable member is in either of its said positions for energizing said clutch disengaging motor whereby initial operation of said power device to move said shiftable member from one gear position to another will effect operation of said clutch disengaging motor and maintain the clutch disengaged until the other gear position of said shiftable member is reached, said last named means comprising an electric circuit including a switch, and a device for maintaining said switch closed during movement of said shiftable member from one gear position to the other.

22. A transmission shifting mechanism for a motor vehicle having a member shiftable between high and low gear positions, a clutch-disengaging motor and a control device therefor, comprising a manually operable handle movable between high and low gear positions, a lever mechanism connecting said handle to said shiftable member to manually move the latter between high and low gear positions, said lever mechanism comprising a pair of levers one of which is mechanically connected to said handle and the other of which is operable independently of the first mentioned lever, and a power device, said first mentioned lever having a fixed pivotal support and having one end mechanically connected to said handle, the second mentioned lever being pivotally supported by said first mentioned lever at a point spaced from the pivotal support thereof, said second mentioned lever having arms respectively connected with said power device and with said shiftable member.

HENRY W. HEY.
JEANNOT G. INGRES.

REFERENCES CITED

The following references are of record in the file of this patent:

UNITED STATES PATENTS

| Number | Name | Date |
|---|---|---|
| 2,062,104 | Prince | Nov. 24, 1936 |
| 2,137,961 | Voreck | Nov. 22, 1938 |
| 2,163,880 | Houston et al. | June 27, 1939 |
| 2,169,216 | Bloxsom | Aug. 15, 1939 |
| 2,200,013 | Sanford | May 7, 1940 |
| 2,202,866 | Price | June 4, 1940 |
| 2,226,660 | Eaton et al. | Dec. 31, 1940 |
| 2,230,780 | Lasley et al. | Feb. 4, 1941 |
| 2,231,966 | Swennes | Feb. 18, 1941 |
| 2,234,463 | Brewer | Mar. 11, 1941 |
| 2,287,272 | Price et al. | June 23, 1942 |
| 2,335,444 | Randol | Nov. 30, 1943 |
| 2,348,435 | Hey et al. | May 9, 1944 |
| 2,434,717 | Randol | Jan. 20, 1948 |